United States Patent
Satoh et al.

(10) Patent No.: US 6,465,071 B1
(45) Date of Patent: Oct. 15, 2002

(54) OPTICAL DISK

(75) Inventors: Takeshi Satoh; Masaru Sugahara, both of Tochigi-ken (JP)

(73) Assignee: Kao Corporation, Tokyo (JP)

( * ) Notice: Subject to any disclaimer, the term of this patent is extended or adjusted under 35 U.S.C. 154(b) by 74 days.

(21) Appl. No.: 09/595,027

(22) Filed: Jun. 16, 2000

(51) Int. Cl.⁷ .................................................. B32B 3/02
(52) U.S. Cl. ................. 428/64.4; 428/64.4; 430/270.12
(58) Field of Search ............................... 428/64.1, 64.2, 428/64.4, 457, 913; 430/270.11, 270.12, 495.1, 945; 369/275.1, 283, 288

(56) References Cited

U.S. PATENT DOCUMENTS 6,007,889 A * 12/1999 Nee .......................... 428/64.1

FOREIGN PATENT DOCUMENTS

| JP | 6-055887 | 3/1994 |
| JP | 8-273201 | 10/1996 |
| JP | 9-081964 | 3/1997 |
| JP | 11-039723 | 2/1999 |

* cited by examiner

Primary Examiner—Elizabeth Mulvaney
(74) Attorney, Agent, or Firm—Oblon, Spivak, McClelland, Maier & Neustadt, P.C.

(57) ABSTRACT

The present invention relates to an optical disk which achieves stable electrical characteristics and disk shape, and in which visible information is provided on the signal readout surface side of the disk. An optical disk is constructed by sequentially layering on the pits of a transparent disk substrate (1a), a recording layer (2a) of a translucent reflective film, an optical buffer layer (3a) formed from a light transmissive material, and a printed layer (4a) on which is printed visible information, with the visible information of the printed layer (4a) being visible from the disk substrate (1a) side of the disk. The optical buffer layer (3a) is formed at a thickness, measured in terms of optical distance (the product of multiplying the physical distance by the refractive index of the material from which the optical buffer layer is formed), of between 3 μm~45 μm.

17 Claims, 1 Drawing Sheet

OPTICAL DISK

BACKGROUND OF THE INVENTION

1. Field of the Invention

The present invention relates to an optical disk comprising a printed layer on a signal readout surface side of the disk wherein the printed layer is used for displaying material such as the content of the recorded information, and in particular relates to technology which can reduce the effect of the printed layer on the electrical characteristics and stabilize the disk shape.

2. Description of the Related Art

In conventional optical disks, typically a printed layer is provided for displaying visual information such as figures and symbols so that the content of the recorded information can be readily understood.

For example, in the case of single sided recording reproduction type optical disks such as CDs (compact disks), a printed layer, which is formed by methods such as screen printing or offset printing, is provided onto the protective layer positioned on the disk surface reverse to the information signal readout surface, and hence almost the entire surface of the disk can be used for displaying figures and symbols.

In contrast, in the case of double sided recording reproduction type optical disks, onto which larger volumes of information are able to be recorded, the regions of the disk on which a printed layer can be provided are limited to those portions outside of the information recording regions such as the very restricted region close to the central portion of the disk, so as not to obstruct the readout of the information signal. Consequently the surface area which can be used for the display of figures and symbols has been very restricted.

In order to resolve the above problem, attempts have been made to enlarge the display area for visible information on double sided recording reproduction type optical disks, and examples include the inventions disclosed in Japanese Unexamined Patent Publication No. 981964, Japanese Unexamined Patent Publication No. 6-55887, and Japanese Unexamined Patent Publication No. 8-273201.

The inventions above comprise two optical disk base bodies, each of which is formed by sequentially laminating an information signal layer of a translucent reflective film, a protective layer, and a printed layer onto an optical disk substrate, and which are then bonded together with the printed layers facing each other. Consequently, the information signal layer has a predetermined transparency, and the printed layer is visible from the disk substrate side of each disk base body which functions as the information signal readout surface, through the information signal layer and the protective layer.

With such a construction, a large surface area for the printing and display of figures and symbols can be ensured on both sides of the disk, without obstructing the readout of the information signal, even with double sided recording reproduction type optical disks.

However with the conventional technology described above, because the protective layer is formed by the curing of an applied resin, there is a danger that contraction during curing will cause a large distortion of the disk base body, generating a curvature in the substrate. This curvature has become a large problem, particularly in those cases where a double sided recording reproduction type optical disk is produced by bonding two optical disk substrates together. In the aforementioned Japanese Unexamined Patent Publication No. 9-81964, the thickness of the protective layer was reported as being of the order of 40 $\mu$m, but an application of a protective layer of a physical thickness of 40 $\mu$m generates a considerable distortion in the shape of the disk, arising a problem in practical use.

Furthermore, light will reach the printed layer passing through the information signal layer of the translucent reflective film and the protective layer, and then undergo reflection and return along a reverse path to the signal readout surface of the disk. Therefore a problem arises in that the returned light (scattered and reflected light) is superimposed as a disturbance on the readout signal, lowering the electrical characteristics (jitter) of the optical disk.

SUMMARY OF THE INVENTION

The present invention takes the above factors into consideration, with an object of providing an optical disk with good electrical characteristics and little distortion in disk shape, even in those cases where a printed layer is provided on the signal readout surface side of the disk.

In order to achieve the above object, an optical disk according to a first aspect of the present invention comprises a transparent disk substrate, a recording layer formed from a translucent reflective film which is layered on pits based on signal information provided on the disk substrate, an optical buffer layer formed from a light transmissive material, which is layered on the recording layer, and a printed layer which is layered on the optical buffer layer and on which is printed visible information, and is constructed so that the visible information of the printed layer is visible from the disk substrate surface of the optical disk through the recording layer and the optical buffer layer, wherein the thickness of the optical buffer layer is an optical distance of between 3 $\mu$m~45 $\mu$m.

By providing an optical buffer layer between the recording layer and the printed layer, in the manner described above, and prescribing the thickness of the optical buffer layer as an optical distance of between 3 $\mu$m~45 $\mu$m, the scattered and reflected light resulting from light which reaches the printed layer is able to be smoothed, thereby improving the electrical characteristics (jitter). Furthermore, distortion of the disk can be reduced, enabling the manufacture of an optical disk with little curvature and with a good degree of uniformity across the entire disk.

The optical distance described above is the value of the physical distance L multiplied by the refractive index n of the material which forms the optical buffer layer, and is represented by the formula L×n.

Furthermore, the optical disk of the present invention has a reflectance of 45%~55% relative to a reproduction light beam. By prescribing a reflectance relative to the reproduction light beam as 45% or above, as is prescribed in DVD standards, reproduction of optical disks using DVD players can be ensured. Moreover by setting the reflectance relative to the reproduction light beam to 55% or below, the visibility of the visible information on the printed layer can also be ensured.

In an optical disk disclosed in Japanese Unexamined Patent Publication No. 11-39723, because the sputtering time for the formation of an Au translucent reflective film was a relatively short 2.7 seconds, the reflective film was thin and the reflectance was low. Consequently, the reading precision of the information was lowered, making the disk unsuitable for use with DVD.

According to the present invention, the optical buffer layer is preferably formed from a light transmissive material for which the imaginary part k of the complex refractive index satisfies the requirement that $k \leq 1.0$.

The material for formation of the optical buffer layer should preferably not absorb light, but absorption of light in the wavelength of the readout laser beam is acceptable. Provided the imaginary number portion (absorption coefficient) k of the complex refractive index which represents the light absorption of the material which makes up the optical buffer layer satisfies the requirement that $k \leq 1.0$, then there are no problems with visibility of the visible information. Materials for which k=0 are transparent with no light absorption properties.

According to the present invention, if the printed layer is constructed from a first printed layer for printing visible information, and a second printed layer for printing a background color for the visible information, then by selecting a suitable background color, the visibility of the visible information can be further improved. In such a case, if the second printed layer is formed by contact printing of a single color, then the printing process is relatively simple.

Furthermore, if the first printed layer and the second printed layer each have a thickness of 2 $\mu$m~30 $\mu$m, then not only is the visible information of the printed layer readily visible, but the effect by the printed layer on the mechanical characteristics of the optical disk can also be kept to a minimum.

According to the present invention, the material of the aforementioned translucent reflective film may be selected from the group consisting of Au, Au alloy, Cu, Cu alloy, Si, an alloy incorporating Si as a main component, a compound of Si with either carbon or nitrogen, and a mixture of Si and compound of Si with either carbon or nitrogen.

In order to apply the present invention to a double sided recording reproduction type optical disk, an optical disk in which the optical buffer layer has the type of characteristics according to the first aspect of the invention may be used for at least one of a first optical disk and a second optical disk, with the first optical disk and the second optical disk then being bonded together with the respective substrates thereof facing outwards, thereby providing visible information on only one side of the double sided optical disk. Alternatively optical disks in which the buffer layer has the type of characteristics according to the first aspect of the invention may be used for both a first optical disk and a second optical disk, with the two disks then being bonded together with the printed layers facing each other, thereby providing visible information on both sides of the double sided optical disk. In either case, if an opaque adhesive layer is provided between the first optical disk and the second optical disk to bond the two disks together, then the visibility of the visible information is able to be improved.

A double sided recording reproduction type optical disk of the present invention preferably has a reflectance of between 45%~55% relative to the reproduction light beam. Furthermore the optical buffer layer of the optical disk is preferably formed from a light transmissive material for which the imaginary part k of the complex refractive index satisfies the requirement that $k \leq 1.0$. Moreover, the printed layer may be constructed from a first printed layer for printing visible information, and a second printed layer for printing a background color for the visible information, with the second printed layer being formed by single color contact printing. In such cases preferably the first printed layer and the second printed layer each have a thickness of 2 $\mu$m~30 $\mu$m. Furthermore, the material of the translucent reflective film may be selected from the group consisting of Au, Au alloy, Cu, Cu alloy, Si, an alloy incorporating Si as a main component, a compound of Si with either carbon or nitrogen, and a mixture of Si and compound of Si with either carbon or nitrogen.

DESCRIPTION OF THE PREFERRED EMBODIMENTS

Figure 1:
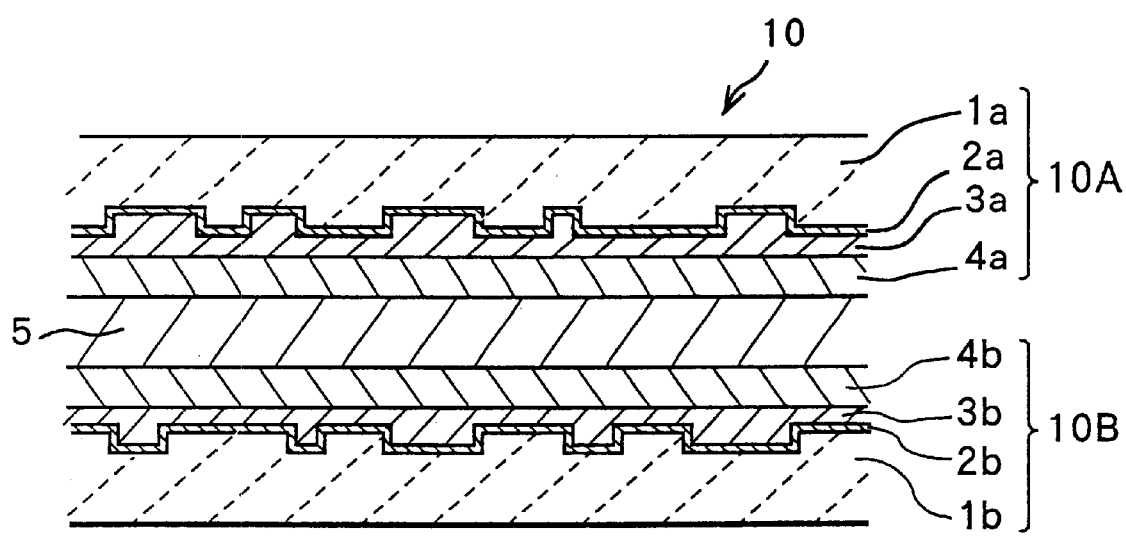
FIG. 1 is a longitudinal sectional view showing an embodiment of a construction of an optical disk of the present invention.

As follows is a description of a preferred embodiment of the present invention based on the drawings.

FIG. 1 is a longitudinal sectional view showing an example of a construction of an optical disk of the present invention.

In FIG. 1, a transparent, circular plate type disk substrate 1a is provided with grooves formed with a concavoconvex pattern corresponding to recorded information, and on the grooves is provided a recording layer 2a formed from a translucent reflective film which has a predetermined reflectance with respect to a reproduction light beam, and a predetermined transmittance within the visible light region. An optical buffer layer 3a of a light transmissive material is provided on the upper surface of the recording layer 2a. Moreover, a printed layer 4a on which is printed visual information such as text and figures is provided on the optical buffer layer 3a. This construction forms a first optical disk 10A. Furthermore in the same manner as the first optical disk 10A, a second optical disk 10B is formed by providing a recording layer 2b, an optical buffer layer 3b and a printed layer 4b on a disk substrate 1b. The first optical disk 10A and the second optical disk 10B are then bonded together using an adhesive 5 with the printed layers 4a, 4b facing each other, thereby forming a double sided recording reproduction type optical disk 10 of the present embodiment.

The disk substrate 1 is formed at a thickness of 0.6 mm by injection molding of a transparent synthetic resin such as a polycarbonate or polyacrylic resin, using a stamper with a surface comprising a concavoconvex pattern which is opposite to the pattern of the recording information.

The recording layer 2 is formed from a translucent reflective film on the concavoconvex pattern of the disk substrate 1, using a sputtering technique or a vacuum deposition method or the like, and with appropriate adjustment of the thickness of the layer, to have a reflectance of 15%~75% relative to the reproduction light beam as well as a transmittance of 10% or above within the visible light region (wavelengths between 380~800 nm). Formation of a translucent reflective film which yields reflectance of 45%~55% relative to the reproduction light beam for the optical disk is particularly preferable. A reflectance of 45% or above ensures that DVD standards are met, thereby ensuring satisfactory reproduction of optical disks using a DVD player. Furthermore, keeping the reflectance of 55% or below ensures good visible definition of the visible information on the printed layer. Preferred materials for the translucent reflective film which forms the recording layer 2 include Au, an alloy incorporating Au, Cu, an alloy incorporating Cu, Si, an alloy incorporating Si as a main component, a compound of Si, and a mixture of Si and compound of Si. Compound of Si with either carbon or nitrogen is particularly preferred as the Si compound.

The optical buffer layer 3 is formed by applying, by means of spin coating techniques or the like, a transparent curable resin, preferably an acrylic based UV curable resin or the like, to achieve a thickness, measured in terms of optical distance, of between 3 μm~45 μm. In those cases where the optical buffer layer 3 is thin, unevenness can develop during formation of the optical buffer layer with the above type of application, whereas if the optical buffer layer 3 is thick, then the curvature of the optical disk itself increases. Consequently, the optical distance should be set within the aforementioned range of 3 μm~45 μm. The optical distance is the value of the physical distance L multiplied by the refractive index n of the material, and is represented by the formula L×n. For example in the case of an acrylic based resin, the value of the refractive index n is approximately n=1.5, and so in such a case the physical distance L would be a thickness of between 2.0 μm~30 μm. Even more preferable thickness values for the optical buffer layer 3 are optical distance values between 5 μm~35 μm. This enables disks to be obtained for which the electrical characteristics and the disk shape are even more stable. Moreover, the optical buffer layer 3 need not necessarily be transparent, but the imaginary part k of the complex refractive index should preferably satisfy the requirement that $k \leq 1.0$, thereby ensuring the visibility of the visible information.

The printed layer 4 can be formed using techniques such as screen printing, offset printing or pad printing. The printed layer 4 may comprise a first printed layer for printing, via mirror image printing for example, visible information such as text or figures in either a single color or multiple colors, and a second printed layer for printing a background color to prevent color mixture with the back surface. By so doing, color mixture between the visible information and the background color can be prevented, and the visibility of the visible information improved. In such cases, if the printing of the second printed layer is carried out to cover the entire printing region with a single color by so-called contact printing, then time and labor for positioning the plate and the like can be eliminated, and the formation of the printed layer 4 becomes simplified, thereby enabling simplification of the process for formation of the printed layer. Moreover, the thickness (the thickness measured in terms of physical distance) of both the first printed layer and the second printed layer is preferably within the range 2 μm~30 μm, with values between 3 μm~20 μm being even more preferable. By making the thickness of the first printed layer and the second printed layer 2 μm or above, it can be prevented that the color is seen through the printed layer, thereby making the visible information such as text and figures even more clearly defined. Moreover, by making the thickness of the first printed layer and the second printed layer 30 μm or below, the degree of curvature of the optical disk substrate caused by contraction of the ink for forming the printed layer during curing can be kept to a minimum. Furthermore, if the thickness of the first printed layer exceeds 30 μm, then the irregularities of the first printed layer which displays text and figures and the like, will have an effect on the reproduction signal during readout of the signal information recorded on the recording layer.

Suitable materials for the adhesive 5 include UV curable resins, hot melts, and pressure sensitive adhesive sheets. If a white colored, opaque adhesive is used, then color mixture between the visible information and the back surface can be prevented, meaning that the second printed layer need not be provided in the printed layer 4.

The embodiment of FIG. 1 shows an example of a double sided recording reproduction type optical disk. However, the invention can also be applied to a single sided recording reproduction type optical disk such as a CD, using a substrate of thickness 1.2 mm. Furthermore, even in the case of double sided recording reproduction type optical disks, it is not necessarily a requirement for the first optical disk 10A and the second optical disk 10B to be of the same construction, as in the case shown in FIG. 1, and either one of the optical disks could also be constructed so that visible information is not visible from the signal readout surface side of the disk.

With the construction of this embodiment, because the optical buffer layer 3 of a thickness, measured in terms of optical distance, of between 3 μm~45 μm is prescribed, the effect on the electrical characteristics of scattered and reflected light reflected off and returning from the printed layer 4 can be reduced, enabling prevention of any deterioration in the electrical characteristics of the optical disk (the jitter). Moreover curvature of the optical disk can also be suppressed to a level comfortably within prescribed limits.

WORKING EXAMPLES

In order to describe the present invention in further detail, as follows is a presentation of a series of working examples and comparative examples.

Working Example 1

A polycarbonate resin was molded using an injection molding device (M35B-D-DM from Meiki Manufacturing Factory) equipped with a stamper prepared in accordance with information signals, to yield a disk substrate 1a of external diameter 120 mm and thickness 0.6 mm.

A recording layer 2a comprising a translucent reflective film of Au was formed on the signal transfer surface of the disk substrate 1a using a sputtering apparatus (CDI-911 from Balzus Corporation) under conditions of an argon atmosphere, an electrical power input of 0.8 kw, and a sputtering time of 3.0 seconds. Measurement of the reflectance using a DVD evaluation device (DDU-1000 from PulseTech Corporation: reproduction laser wavelength of 650 nm, laser output of 0.3 mW) showed a reflectance of 45%. An acrylic resin (SK5000 from Sony Chemicals Corporation, with optical constants for the readout laser light wavelength of n=1.5, k=0.00) was applied to the top of the recording layer 2a comprising the translucent reflective film using spin coating techniques, and subsequently cured with ultraviolet irradiation, to produce the optical buffer layer 3a with a film thickness, measured in terms of optical distance, of 3 μm.

A black colored ultraviolet light curable type ink (Dyecure 582 from Dainihon Inks) was used with a screen printing device to print a mirror image design incorporating both full width and quarter width text characters onto the surface of the optical buffer layer 3a, and the ink was then cured with ultraviolet irradiation. Next, by using a white colored ultraviolet light curable type ink (Dyecure 583 from Dainihon Inks), a layer of contact printing was produced by means of a screen printing device and subsequently cured with ultraviolet irradiation, thereby forming the printed layer 4a, and consequently the first optical disk 10A was obtained. The second optical disk 10B was produced using the same methods.

A holt melt adhesive was applied to the printed layer of each of the first optical disk 10A and the second optical disk 10B, and the disks were then bonded together by bringing the adhesive surfaces together and pressing.

Working Examples 2~6

With the exception of varying the spin coating conditions to produce optical buffer layers of optical distances of 5 μm, 10 μm, 20 μm, 35 μm, and 45 μm respectively, optical disks were prepared in the same manner as that described for the working example 1.

Working Examples 7, 8

With the exception of varying the sputtering conditions to produce translucent reflective films (recording layers) with reflectance values of 20% and 55% respectively, optical disks were prepared in the same manner as that described for the working example 1.

Working Example 9

With the exception of changing the material of the translucent reflective film to Cu, an optical disk was prepared in the same manner as that described for the working example 1.

Working Examples 10, 11

With the exception of varying the spin coating conditions to produce optical buffer layers of optical distances of 20 μm and 45 μm respectively, optical disks were prepared in the same manner as that described for the working example 9.

Working Example 12

With the exception of changing the material of the translucent reflective film to Si, an optical disk was prepared in the same manner as that described for the working example 1.

Working Examples 13, 14

With the exception of varying the spin coating conditions to produce optical buffer layers of optical distances of 20 μm and 45 μm respectively, optical disks were prepared in the same manner as that described for the working example 12.

Working Example 15

With the exception of changing the material of the translucent reflective film to Si+SiC, an optical disk was prepared in the same manner as that described for the working example 1.

Working Examples 16, 17

With the exception of varying the spin coating conditions to produce optical buffer layers of optical distances of 20 μm and 45 μm respectively, optical disks were prepared in the same manner as that described for the working example 15.

Working Example 18

With the exception of changing the material of the translucent reflective film to $Si+Si_3N_4$, an optical disk was prepared in the same manner as that described for the working example 1.

Working Examples 19, 20

With the exception of varying the spin coating conditions to produce optical buffer layers of optical distances of 20 μm and 45 μm respectively, optical disks were prepared in the same manner as that described for the working example 18.

Working Example 21

With the exception of setting the optical distance of the optical buffer layer to 10 μm, and setting the thickness of both a design printed layer formed using a black colored ultraviolet light curable ink, and a contact printed layer formed using a white colored ultraviolet light curable ink, to a physical distance of 10 μm by selecting the mesh size of the screen mesh and by adjusting the thickness of the photosensitizer an optical disk was prepared in the same manner as that described for the working example 1.

Working Example 22

With the exception of setting the thickness of the design printed layer, formed from a black colored ultraviolet light curable ink, to 30 μm by using repeated application, an optical disk was prepared in the same manner as that described for the working example 21.

Working Example 23

With the exception of using offset printing to form the black design printed layer at a thickness of 2 μm, an optical disk was prepared in the same manner as that described for the working example 21.

Working Example 24

With the exception of setting the thickness of the contact printed layer, formed from a white colored ultraviolet light curable ink, to 30 μm by using repeated application, an optical disk was prepared in the same manner as that described for the working example 21.

Working Example 25

With the exception of using offset printing to form the white contact printed layer at a thickness of 2 μm, an optical disk was prepared in the same manner as that described for the working example 21.

Comparative Examples 1~5

With the exception of not providing an optical buffer layer, optical disks were prepared in the same manner as that described for the working examples 1, 9, 12, 15, and 18 respectively.

Comparative Examples 6~10

With the exception of varying the spin coating conditions to produce optical buffer layers of optical distances of 50 μm, optical disks were prepared in the same manner as that described for the working examples 1, 9, 12, 15, and 18 respectively.

Comparative Example 11

With the exception of setting the thickness of the design printed layer, formed from a black colored ultraviolet light curable ink, to 40 μm by using repeated application, an optical disk was prepared in the same manner as that described for the working example 21.

Comparative Example 12

With the exception of using offset printing to form the black design printed layer at a thickness of 1 μm, an optical disk was prepared in the same manner as that described for the working example 21.

Comparative Example 13

With the exception of setting the thickness of the contact printed layer, formed from a white colored ultraviolet light curable ink, to 40 μm by using repeated application, an optical disk was prepared in the same manner as that described for the working example 21.

Comparative Example 14

With the exception of using offset printing to form the white contact printed layer at a thickness of 1 μm, an optical disk was prepared in the same manner as that described for the working example 21.

For the optical disks of each of the working examples 1~25 and each of the comparative examples 1~14, measurements were conducted of both the electrical characteristics and the mechanical characteristics, and the visibility was also evaluated.

The electrical characteristics were measured using a DDU-1000 device from PulseTech Corporation (readout laser wavelength of 650 nm, NA=0.6), with jitter values of 8% or below being evaluated as OK. Furthermore, the mechanical characteristics were measured using a S3DL-3MI device from Adomon Science Corporation, with disks being evaluated as OK if the camber angle in a radial direction was within ±0.8 degrees, and the camber angle in a circumferential direction was within ±0.3 degrees. Disks were also measured using a LM-1200DVD device from Ono Instruments Corporation, with vertical acceleration values of 8 m/s$^2$ or below being evaluated as OK.

The vertical acceleration is an amount which reflects the undulation of the recording surface (recording layer) across the optical disk. Specifically, it denotes the degree of acceleration generated when the pickup for signal reproduction which focused the light beam on the recording surface moves in a direction perpendicular to the recording surface so as to attempt to maintain that focus during rotation of the optical disk. If this value is large, then the pickup is unable to track the undulations in the recording surface, and so the focus is lost and the signal can not be reproduced.

Visibility was judged as OK if both the full width text characters and the quarter width text characters, as well as the printed design were readable. Optical disks for which the mechanical characteristics and the visibility were judged to be unacceptable were labeled NG.

The results of the evaluation of the electrical characteristics, the mechanical characteristics, and the visibility are shown in Table 1 and Table 2.

TABLE 1

| | Translucent reflective film material | Reflectance (%) | Optical buffer layer material (n, k) | Optical distance (μm) | Electrical characteristics (Jitter ≤8%) | Mechanical characteristics (curvature) | Visibility | Compatibility of reflectance with DVD standards (45~85%) |
|---|---|---|---|---|---|---|---|---|
| Working Example 1 | Au | 45 | (1.5, 0.0) | 3 | OK | 7.5 | OK | OK | OK |
| Working Example 2 | Au | 45 | (1.5, 0.0) | 5 | OK | 7.2 | OK | OK | OK |
| Working Example 3 | Au | 45 | (1.5, 0.0) | 10 | OK | 6.9 | OK | OK | OK |
| Working Example 4 | Au | 45 | (1.5, 0.0) | 20 | OK | 6.5 | OK | OK | OK |
| Working Example 5 | Au | 45 | (1.5, 0.0) | 35 | OK | 6.0 | OK | OK | OK |
| Working Example 6 | Au | 45 | (1.5, 0.0) | 45 | OK | 6.0 | OK | OK | OK |
| Working Example 7 | Au | 20 | (1.5, 0.0) | 3 | OK | 7.8 | OK | OK | NG |
| Working Example 8 | Au | 55 | (1.5, 0.0) | 3 | OK | 7.2 | OK | OK | OK |
| Working Example 9 | Cu | 45 | (1.5, 0.0) | 3 | OK | 7.5 | Ok | OK | OK |
| Working Example 10 | Cu | 45 | (1.5, 0.0) | 20 | OK | 6.6 | OK | OK | OK |
| Working Example 11 | Cu | 45 | (1.5, 0.0) | 45 | Ok | 6.0 | OK | OK | OK |
| Working Example 12 | Si | 45 | (1.5, 0.0) | 3 | OK | 7.5 | OK | OK | OK |
| Working Example 13 | Si | 45 | (1.5, 0.0) | 20 | OK | 6.6 | OK | OK | OK |
| Working Example 14 | Si | 45 | (1.5, 0.0) | 45 | OK | 6.0 | OK | OK | OK |
| Working Example 15 | Si + SiC | 45 | (1.5, 0.0) | 3 | OK | 7.5 | OK | OK | OK |
| Working Example 16 | Si + SiC | 45 | (1.5, 0.0) | 20 | OK | 6.6 | OK | OK | OK |
| Working Example 17 | Si + SiC | 45 | (1.5, 0.0) | 45 | OK | 6.0 | OK | OK | OK |
| Working Example 18 | Si + Si$_3$N$_4$ | 45 | (1.5, 0.0) | 3 | OK | 7.5 | OK | OK | OK |
| Working Example 19 | Si + Si$_3$N$_4$ | 45 | (1.5, 0.0) | 20 | OK | 6.6 | OK | OK | OK |
| Working Example 20 | Si + Si$_3$N$_4$ | 45 | (1.5, 0.0) | 45 | OK | 6.0 | OK | OK | OK |
| Comparative Example 1 | Au | 45 | — | n/a | NG | 9.0 | OK | OK | OK |
| Comparative Example 2 | Cu | 45 | — | n/a | NG | 8.9 | OK | OK | OK |

TABLE 1-continued

| | Translucent reflective film material | Reflectance (%) | Optical buffer layer material (n, k) | Optical distance ($\mu$m) | Electrical characteristics (Jitter $\leq$8%) | | Mechanical characteristics (curvature) | Visibility | Compatibility of reflectance with DVD standards (45~85%) |
|---|---|---|---|---|---|---|---|---|---|
| Comparative Example 3 | Si | 45 | — | n/a | NG | 8.9 | OK | OK | OK |
| Comparative Example 4 | Si + SiC | 45 | — | n/a | NG | 9.0 | OK | OK | OK |
| Comparative Example 5 | Si + Si$_3$N$_4$ | 45 | — | n/a | NG | 9.0 | OK | OK | OK |
| Comparative Example 6 | Au | 45 | (1.5, 0.0) | 50 | OK | 6.0 | NG | OK | OK |
| Comparative Example 7 | Cu | 45 | (1.5, 0.0) | 50 | OK | 6.0 | NG | OK | OK |
| Comparative Example 8 | Si | 45 | (1.5, 0.0) | 50 | OK | 6.0 | NG | OK | OK |
| Comparative Example 9 | Si + SiC | 45 | (1.5, 0.0) | 50 | OK | 6.0 | NG | OK | OK |
| Comparative Example 10 | Si + Si$_3$N$_4$ | 45 | (1.5, 0.0) | 50 | OK | 6.0 | NG | OK | OK |

TABLE 2

| | Translucent reflective film material | Reflectance (%) | Optical buffer layer optical distance ($\mu$m) | Design printed layer thickness ($\mu$m) | Contact printed layer thickness ($\mu$m) | Mechanical characteristics (vertical acceleration) | Mechanical characteristics (curvature) | Visibility |
|---|---|---|---|---|---|---|---|---|
| Working Example 21 | Au | 45 | 10 | 10 | 10 | OK | OK | OK |
| Working Example 22 | Au | 45 | 10 | 30 | 10 | OK | OK | OK |
| Working Example 23 | Au | 45 | 10 | 2 | 10 | OK | OK | OK |
| Working Example 24 | Au | 45 | 10 | 10 | 30 | OK | OK | OK |
| Working Example 25 | Au | 45 | 10 | 10 | 2 | OK | OK | OK |
| Comparative Example 11 | Au | 45 | 10 | 40 | 10 | NG | NG | OK |
| Comparative Example 12 | Au | 45 | 10 | 1 | 10 | OK | OK | NG |
| Comparative Example 13 | Au | 45 | 10 | 10 | 40 | OK | NG | OK |
| Comparative Example 14 | Au | 45 | 10 | 10 | 1 | OK | OK | NG |

As is apparent from the results shown in Table 1 and Table 2, the electrical characteristics, the mechanical characteristics (curvature) and the visibility were evaluated as OK for all of the working examples 1~25. Furthermore, in the comparative examples 1~5 where no optical buffer layer was provided, the mechanical characteristics and the visibility were evaluated as OK, but the electrical characteristics were rated as NG. In the case of the comparative examples 6~10, in which the optical distance of the optical buffer layer was increased to 50 $\mu$m, the electrical characteristics and the visibility were evaluated as OK, but the mechanical characteristics were rated as NG. In the comparative examples 11 and 13, in which the thickness of the printed layer was increased to 40 $\mu$m, the visibility was evaluated as OK, but the mechanical characteristics (curvature) was rated as NG. Particularly in the case of the comparative example 11, in which the thickness of the first printed layer was 40 $\mu$m, the vertical acceleration was rated as NG. In the comparative examples 12 and 14, in which the thickness of the printed layers was reduced to 1 $\mu$m, the mechanical characteristics were evaluated as OK, but the visibility was rated as NG.

We claim:

1. An optical disk comprising a transparent disk substrate, a recording layer formed from a translucent reflective film which is layered on pits based on signal information provided on said disk substrate, an optical buffer layer formed from a light transmissive material, which is layered on said recording layer, and a printed layer which is layered on said optical buffer layer and on which is printed visible information, and constructed so that said visible information on said printed layer is visible from said disk substrate surface through said recording layer and said optical buffer layer,
   wherein the thickness of said optical buffer layer is an optical distance of between 3 $\mu$m~45 $\mu$m.

2. An optical disk according to claim 1, which has a reflectance of 45%~55% relative to a reproduction light beam.

3. An optical disk according to claim 1, wherein said optical buffer layer is formed from a light transmissive material for which the imaginary part k of the complex refractive index satisfies a requirement that k$\leq$1.0.

4. An optical disk according to claim 1, wherein said printed layer comprises a first printed layer for printing visible information, and a second printed layer for printing a background color for said visible information.

5. An optical disk according to claim 4, wherein said second printed layer is formed by contact printing of a single color.

6. An optical disk according to claim 4, wherein said first printed layer and said second printed layer each have a thickness of 2 µm~30 µm.

7. An optical disk according to claim 1, wherein the material of said translucent reflective film is selected from a the group consisting of gold, copper, an alloy of gold and copper, silicon, an alloy incorporating silicon as a main component, a compound of silicon with carbon, a compound of silicon with nitrogen, a mixture of silicon and a compound of silicon with carbon, and a mixture of silicon and a compound of silicon with nitrogen.

8. An optical disk in which at least one of a first optical disk and a second optical disk comprises a transparent disk substrate, a recording layer formed from a translucent reflective film which is layered on pits based on signal information provided on said disk substrate, an optical buffer layer formed from a light transmissive material, which is layered on said recording layer, and a printed layer which is layered on said optical buffer layer and on which is printed visible information, in which said visible information on said printed layer is visible from said disk substrate surface through said recording layer and said optical buffer layer, and in which a thickness of said optical buffer layer is an optical distance of between 3 µm~45 µm, wherein said first optical disk and said second optical disk are bonded together with respective substrate surfaces thereof facing outwards.

9. An optical disk according to claim 8, wherein said first optical disk and said second optical disk are bonded together by an opaque adhesive layer provided therebetween.

10. An optical disk according to claim 8, wherein both said first optical disk and said second optical disk comprise a transparent disk substrate, a recording layer formed from a translucent reflective film which is layered on pits based on signal information provided on said disk substrate, an optical buffer layer formed from a light transmissive material, which is layered on said recording layer, and a printed layer which is layered on said optical buffer layer and on which is printed visible information, in which said visible information on said printed layer is visible from said disk substrate surface through said recording layer and said optical buffer layer, and in which a thickness of said optical buffer layer is an optical distance of between 3 µm~45 µm, wherein said first optical disk and said second optical disk are bonded together with said printed layers facing each other.

11. An optical disk according to claim 10, wherein said printed layer of said first optical disk and said printed layer of said second optical disk are bonded together by an opaque adhesive layer provided therebetween.

12. An optical disk according to claim 8, which has a reflectance of 45%~55% relative to a reproduction light beam.

13. An optical disk according to claim 8, wherein said optical buffer layer is formed from a light transmissive material for which the imaginary part k of the complex refractive index satisfies a requirement that k≦1.0.

14. An optical disk according to claim 8, wherein said printed layer comprises a first printed layer for printing visible information, and a second printed layer for printing a background color for said visible information.

15. An optical disk according to claim 14, wherein said second printed layer is formed by contact printing of a single color.

16. An optical disk according to claim 14, wherein said first printed layer and said second printed layer each have a thickness of 2 µm~30 µm.

17. An optical disk according to claim 8, wherein the material of said translucent reflective film is selected from a group consisting of Au and Cu and alloys thereof, Si, an alloy incorporating Si as a main component, a compound of Si with either carbon or nitrogen, and a mixture of Si and compound of Si with either carbon or nitrogen.

* * * * *